(12) United States Patent
Yamanaka (10) Patent No.: US 11,148,533 B2
(45) Date of Patent: Oct. 19, 2021

(54) VEHICLE ACTIVATION SYSTEM

(71) Applicant: Mitsubishi Jidosha Kogyo Kabushiki Kaisha, Tokyo (JP)

(72) Inventor: Yasuhiro Yamanaka, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 438 days.

(21) Appl. No.: 16/375,360

(22) Filed: Apr. 4, 2019

(65) Prior Publication Data
US 2019/0308506 A1 Oct. 10, 2019

(30) Foreign Application Priority Data

Apr. 6, 2018 (JP) .............................. JP2018-074027

(51) Int. Cl.
*B60L 9/00* (2019.01)
*B60L 3/00* (2019.01)
*H02J 7/00* (2006.01)
*B60L 58/14* (2019.01)
*B60W 50/04* (2006.01)

(52) U.S. Cl.
CPC ........... *B60L 3/0092* (2013.01); *B60L 3/0046* (2013.01); *B60L 3/0084* (2013.01); *B60L 58/14* (2019.02); *H02J 7/0026* (2013.01); *B60W 2050/043* (2013.01)

(58) Field of Classification Search
CPC ...... B60L 3/0092; B60L 3/0084; B60L 58/14; B60L 3/0046; B60L 1/00; B60L 9/00; H02J 7/0026; H02J 7/00306; H02J 2207/10; H02J 7/0029; B60W 2050/043; Y02T 10/70

USPC .......................................................... 701/22
See application file for complete search history.

(56) References Cited

U.S. PATENT DOCUMENTS

| 9,662,989 | B2 * | 5/2017 | Watanabe | ............. B60L 3/0084 |
| 2015/0035486 | A1 * | 2/2015 | Yamaguchi | ............... B60L 3/04 320/109 |
| 2015/0210232 | A1 * | 7/2015 | Kanzaki | ................... H02H 7/18 701/36 |
| 2015/0343918 | A1 * | 12/2015 | Watanabe | ................. B60L 3/04 324/764.01 |

FOREIGN PATENT DOCUMENTS

JP 2016-7121 A 1/2016

OTHER PUBLICATIONS

Extended European Search Report dated Sep. 24, 2019 in corresponding European Application No. 19164260.2.

* cited by examiner

*Primary Examiner* — Shardul D Patel
(74) *Attorney, Agent, or Firm* — Birch, Stewart, Kolasch & Birch, LLP (57) ABSTRACT

A vehicle activation system is configured so that when a switch is turned on, current is passed from a backup power supply circuit to a signal circuit and electric power is supplied from the backup power supply circuit to a power supply relay. The vehicle activation system includes an interruption circuit which is capable of interrupting the supply of electric power from the backup power supply circuit to the power supply relay.

20 Claims, 7 Drawing Sheets

FIG. 5A
NORMAL

FIG. 5B
ABNORMAL (GROUND FAULT)

FIG. 5C
ABNORMAL (ON-STATE FIXATION)

VEHICLE ACTIVATION SYSTEM

TECHNICAL FIELD

The disclosure relates to a vehicle activation system which allows a vehicle control device to be activated while the vehicle is in a stopped state.

BACKGROUND

There has been a known vehicle such as an electric vehicle and a plug-in hybrid vehicle provided with a battery for driving which can be recharged by connecting an external power supply to the vehicle. The vehicle of this kind is allowed to be recharged in a stopped state (when the power supply is in an off-state) or the vehicle control device can be activated by outputting an activation request signal from an on-board device such as an on-board charger or an on-board switch in order to temporarily control the vehicle.

Patent Document 1 (JP2016-7121A) discloses a charging system including a charging start signal circuit (a signal circuit) which activates a control unit by outputting a charging start signal (a signal) to a vehicle control unit (a control device) which controls charging from an on-board charger by connecting the on-board charger and a charging gun and a fault diagnostic device for the charging system.

In the electric vehicle charging system and the fault diagnostic device disclosed in Patent Document 1, however, a fault may be diagnosed and notified, but if, for example, an abnormality which causes the charging start signal circuit to be constantly in a current-conducting state because of a ground fault or the like, the charging start signal is constantly output (on), and the control unit cannot be stopped. In this way, when the charging start signal circuit (the signal circuit) which connects the on-board charger and the control unit has a ground fault or when the switch of the on-board charger is fixed to an on-state and the charging start signal circuit is constantly in an on-state (in the state in which the charging start signal is constantly input), current continues to be passed to the control unit, which causes a battery (an auxiliary battery) to be over-discharged in the worst case, and the control unit (the controller as the control device) cannot be activated when necessary.

In this regard, it is an object of at least one embodiment of the present invention to provide a vehicle activation system capable of activating a control device while the vehicle is in a stopped state (while the power supply is in an off-state), and the activation system ensures that the control device attains a stoppable state upon the occurrence of an abnormality which causes the signal circuit to be constantly in a current-conducting state (in the state in which a signal continues to be input).

SUMMARY

A vehicle activation system according to an aspect of the present invention includes a control device activated in response to turning on of a vehicle power switch and stopped in response to turning off of the vehicle power switch, a battery which supplies electric power to the control device, a power supply relay provided between the control device and the battery and capable of turning on/off the supply of electric power from the battery to the control device, an activation circuit which connects a backup power supply circuit for the control device and the power supply relay, and a switch connected to the backup power supply circuit through a signal circuit and capable of passing current so that current is passed from the backup power supply circuit to the signal circuit, the vehicle activation system is configured so that current is passed from the backup power supply circuit to the signal circuit in response to turning on of the switch, so that electric power is supplied from the backup power supply circuit to the power supply relay, and the vehicle activation system includes an interruption circuit capable of interrupting the supply of electric power from the backup power supply circuit to the power supply relay.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION

Hereinafter, embodiments of the present invention will be described in detail with reference to the accompanying drawings. However, dimensions, materials, shapes, relative positional arrangements, and the like of components illustrated in the following description of the embodiments and the drawings are not intended to limit the scope of the present invention and shall be interpreted as illustrative only.

Meanwhile, the wording "comprising," or "including" one element is not an exclusive expression to exclude the presence of any other element.

A vehicle activation system according to at least one embodiment of the present invention includes a control device activated in response to turning on of a vehicle power switch and stopped in response to turning off of the vehicle power switch, a battery which supplies electric power to the control device, a power supply relay provided between the control device and the battery and capable of turning on/off the supply of electric power from the battery to the control device, an activation circuit which connects a backup power supply circuit for the control device and the power supply relay, and a switch connected to the backup power supply circuit through a signal circuit and capable of passing current so that current is passed from the backup power supply circuit to the signal circuit, the vehicle activation system is configured so that current is passed from the backup power supply circuit to the signal circuit in response to turning on of the switch, so that electric power is supplied from the backup power supply circuit to the power supply relay, and the vehicle activation system includes an interruption circuit capable of interrupting the supply of electric power from the backup power supply circuit to the power supply relay.

According to the configuration above, current is passed to the backup power supply circuit and then to the signal circuit in response to turning on of the switch, so that electric power is supplied from the backup power supply circuit to the power supply relay. In this way, supply of electric power to the control device is turned on (the control device is activated). Upon the occurrence of an abnormality which causes the signal circuit to be constantly in a current-conducting state (in the state in which a signal continues to be input thereto), current is passed to the backup power supply circuit and then to the signal circuit, so that electric power is supplied from the backup power supply circuit to the power supply relay. In this case, the current passed in the order of the backup power supply circuit and the signal circuit cannot be interrupted by turning off the switch, and therefore the supply of electric power from the battery to the control device is kept in an on-state and the state cannot be cancelled.

Meanwhile, the interruption circuit capable of interrupting supply of electric power from the backup power supply circuit to the power supply relay is provided, so that supply of electric power from the backup power supply circuit to the power supply relay can be interrupted (the control device can be stopped) by the interruption circuit upon the occurrence of an abnormality which causes the signal circuit to be constantly in a current-conducting state (in the state in which a signal continues to be input thereto).

Therefore, it is ensured that the control device can be stoppable upon the occurrence of an abnormality which causes the signal circuit to be constantly in a current-conducting state (in the state in which a signal continues to be input thereto).

A vehicle activation system according to one embodiment of the present invention can activate a control device in response to an activation request from an on-board device or an on-board switch while a power switch for starting/stopping the vehicle is in an off-state (when the vehicle is stopped), and the system includes a circuit configuration which allows the control device to attain a stoppable state upon the occurrence of an abnormality which causes an activation request signal circuit connecting the on-board device or the on-board switch and a backup power supply for the control device to be constantly in a current-conducting state and current to continue to be passed from the backup power supply circuit to the activation request signal circuit, in other words, upon the occurrence of an abnormality which causes the activation request signal to be constantly input to the control device.

In the following description, the vehicle is a plug-in hybrid vehicle (hereinafter as the "PHEV") by way of illustration, but the vehicle is not limited to the PHEV and may include any other electric and regular automobiles.

The PHEV includes an engine and a motor as a motive power source and can be connected to an external power supply (such as a normal charger or a quick charger) to have its driving battery recharged.

Figure 1:
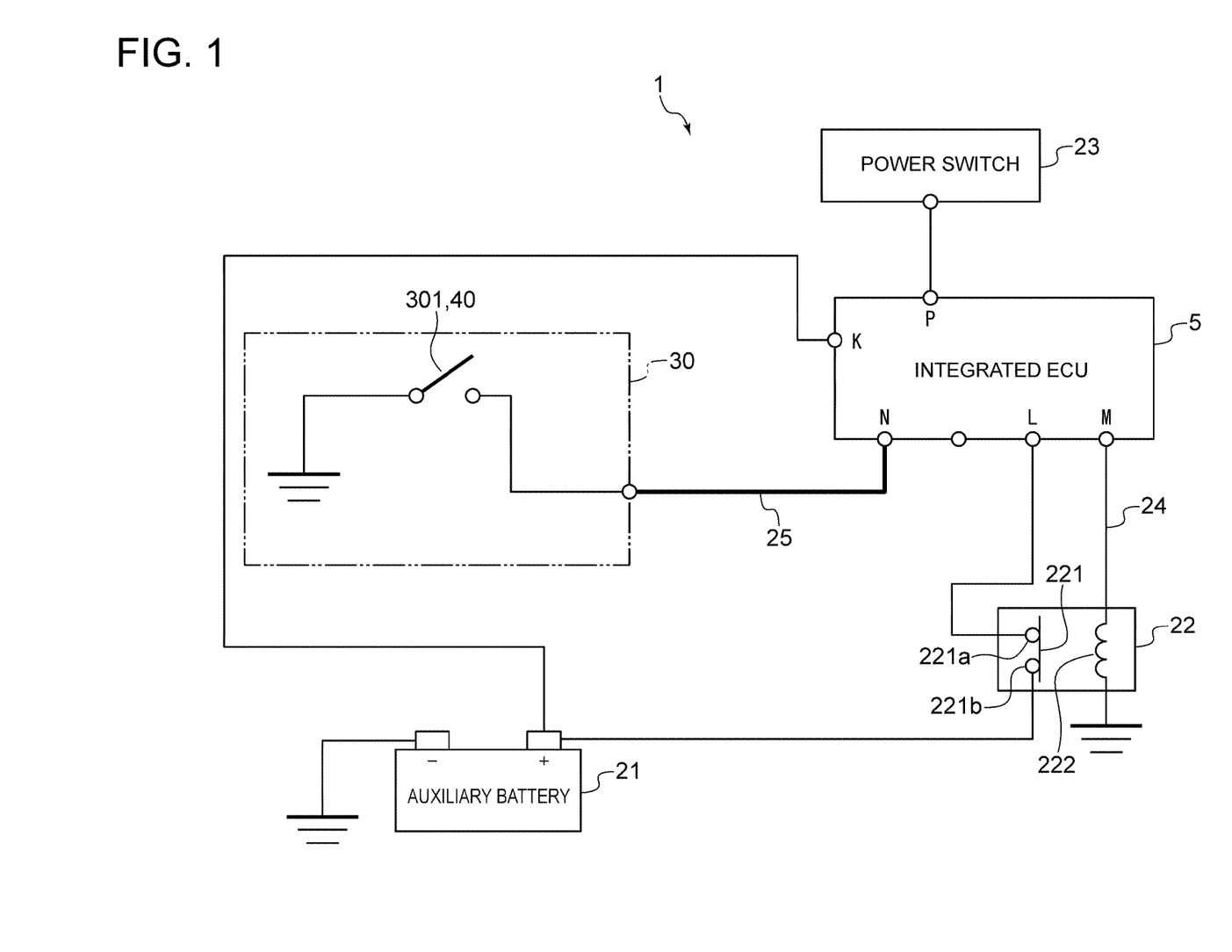
FIG. 1 is a schematic block diagram of a vehicle activation system provided in a PHEV according to one embodiment.
Figure 2:
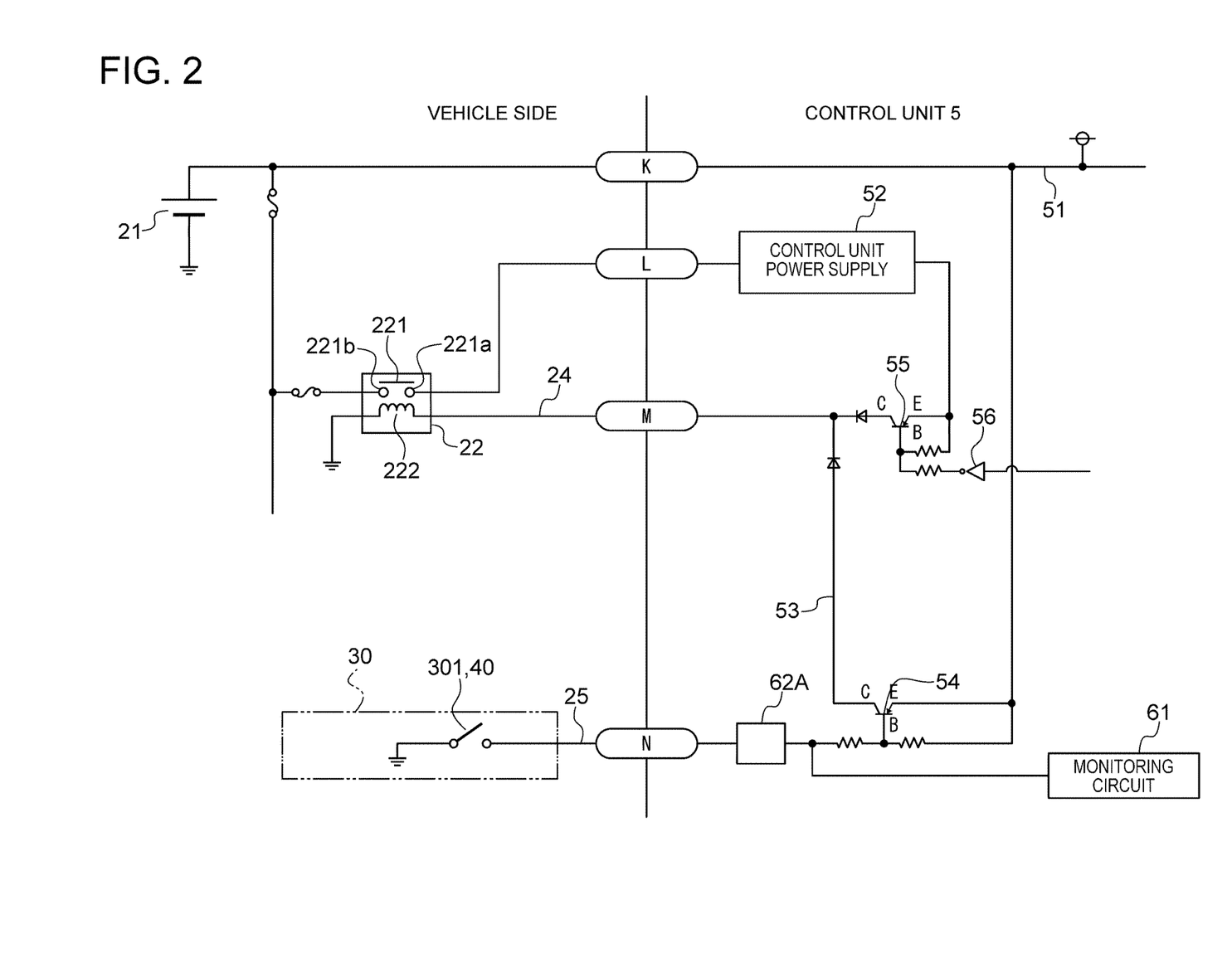
FIG. 2 is a circuit diagram showing in detail the vehicle activation system according to the embodiment shown in FIG. 1.

FIG. 1 is a schematic block diagram of a vehicle activation system 1 provided in a PHEV according to an embodiment of the present invention. FIG. 2 is a circuit diagram showing in detail the vehicle activation system 1 shown in FIG. 1.

As shown in FIG. 1, the PHEV includes various on-board devices and on-board switches used for example for recharging the driving battery, managing the driving battery, and managing the engine, a control device 5 (hereinafter as the "control unit 5") used for overall control of the vehicle including these various devices, an auxiliary battery 21 capable of supplying electric power to the various on-board devices and the control unit 5, and a power switch 23 for starting/stopping the vehicle.

The control unit 5 is in an activated state when the power switch 23 is in an on-state and in a sleep state (stopped state) when the power switch 23 is in an off-state.

The on-board devices used for example for recharging the driving battery, managing the driving battery, and managing the engine include on-board devices 30 capable of requesting activation to the control unit 5 in a sleep state (as the power switch 23 is in an off-state). The on-board device 30 capable of requesting activation to the control unit 5 may be an on-board charger (OBC), an engine control module (ECM) or a battery management system (BMS).

The on-board device 30 capable of requesting activation to the control unit 5 in a sleep state has a switch 301, and one end of the switch 301 is grounded to the vehicle body of the PHEV. The switch 301 of the on-board device 30 includes a switch which is turned on (an activation request signal is on) for a prescribed time period when activation is requested to the control unit 5 in a sleep state, and the switch is turned off after the prescribed time period (the activation request signal is off). The on-board device 30 turns on the switch 301 to request activation to the control unit 5 when a prescribed condition is satisfied. The control unit 5 is activated in response to turning on of the switch 301 by an ECU in the on-board devices 30, and various kinds of control are carried out according to the on-board device 30. For example, if the on-board device 30 is an on-board charger, the switch 301 is turned on, provided that a charging connector (a charging gun) is connected to a charging supply outlet, so that the control unit 5 is activated and an actuator which locks the charging connector is driven (in a normal charging case). For example, when the on-board device 30 is an engine control device, the switch 301 is turned on in response to detection of operation of the opener of a fuel inlet, and the control unit 5 is activated, so that the engine control device and the meter are allowed to communicate with each other. For example, when the on-board device 30 is a battery management device, the battery management device is activated regularly and determines the necessity of activating the control unit 5 on the basis of battery information about the driving battery, etc., in response to which the switch 301 is turned, which in turn activates the control unit 5, so that temperature adjustment control is started.

The various on-board switches used for recharging the driving battery, managing the driving battery, and managing the engine may include various on-board switches 40 capable of requesting activation to the control unit 5 in a sleep state. The various on-board switches 40 capable of requesting activation to the control unit 5 in a sleep state are for example a charge lid push switch, a charging connector unlocking switch or an immediate charging switch.

The on-board switch 40 capable of requesting activation to the control unit 5 in a sleep state has one end grounded to the vehicle body of the PHEV. The on-board switch 40 may include a switch which is in an on state (an activation request signal in an on-state) for a time period during which the switch is pressed by a user, and is turned off when the user stops pressing the on-board switch 40 (the activation request signal in an off-state).

The control unit 5 is activated in response to turning on of any of these various on-board switches 40 and controls the vehicle in response to the turned on on-board switch 40. For example, when the on-board switch 40 is a charge lid push switch, the activated control unit 5 activates an actuator so that the charge lid is unlocked. When for example the on-board switch 40 is a charging connector unlocking switch, the activated control unit 5 activates the actuator so that the charging connector is unlocked. When for example the on-board switch 40 is an immediate charging switch, the activated control unit 5 cancels timer reservation charging and immediate charging is allowed.

The control unit 5 has a plurality of external connection terminals. The plurality of external connection terminals are terminals used to connect with external devices such as the auxiliary battery 21, a power supply relay 22, the power switch 23, the on-board device 30, and the on-board switch 40 and can be identified for example by letters K to N and P.

The terminal of the control unit 5 identified by the letter K (hereinafter as the "K terminal") is connected with the positive electrode of the auxiliary battery 21, and the negative electrode of the auxiliary battery 21 is grounded to the vehicle body of the PHEV. Therefore, electric power can be constantly supplied from the auxiliary battery 21 to the K terminal.

The terminal of the control unit 5 identified by the letter L (hereinafter as the "L terminal") is connected with one switch terminal 221a of the power supply relay 22, and the other switch terminal 221b of the power supply relay 22 is connected to the positive electrode of the auxiliary battery 21. Therefore, when the switch 221 of the power supply relay 22 is turned on, electric power is supplied from the auxiliary battery 21 to the L terminal, while when the switch 221 of the power supply relay 22 is turned off, the supply of electric power from the auxiliary battery 21 to the L terminal is interrupted (stopped).

The terminal of the control unit 5 identified by the letter M (hereinafter as the "M terminal") is connected with one end of a control power supply control circuit 24. The control power supply control circuit 24 is a circuit adapted to control the control unit power supply 52 of the control unit 5 (see FIG. 2). The other end of the control power supply control circuit 24 is connected with one end of the coil 222 of the power supply relay 22, and the other end of the coil 222 of the power supply relay 22 is grounded to the vehicle body of the PHEV. Therefore, when current is passed from the M terminal to the control power supply control circuit 24, the current is passed through the coil 222 of the power supply relay 22, so that the coil 222 of the power supply relay 22 is excited. In this way, the switch 221 of the power supply relay 22 is turned on, so that electric power is supplied from the auxiliary battery 21 to the L terminal. Meanwhile, when the flow of current from the M terminal to the control power supply control circuit 24 is interrupted (stopped), the flow of current from the power supply relay 22 to the coil 222 is also interrupted, so that coil 222 of the power supply relay 22 is demagnetized. In this way, the switch 221 of the power supply relay 22 is turned off, and the supply of electric power from the auxiliary battery 21 to the L terminal is interrupted (stopped).

The terminal of the control unit 5 identified by the letter N (hereinafter referred to as the "N terminal") is connected with one end of an activation request signal circuit 25. The activation request signal circuit 25 is a circuit adapted to allow the control unit 5 in a sleep state to detect an activation request signal. The other end of the activation request signal circuit 25 is connected to the switch 301 of the on-board device 30 or the on-board switch 40 capable of requesting activation to the control unit 5 in a sleep state. Therefore, when the switch 301 of the on-board device 30 or the on-board switch 40 is switched from an off-state to an on-state, current is passed from the N terminal to the activation request signal circuit 25, and the switch 301 of the on-board device 30 or the on-board switch 40 in this order (the activation request signal is input (the activation request signal is on)).

The terminal of the control unit 5 identified by the letter P (hereinafter as the "P terminal") is connected with one end of the power switch 23 (IGSW). The power switch 23 is a switch adapted to start the vehicle by activating the control unit 5. The other end of the power switch 23 is connected with the positive electrode of the auxiliary battery 21. Therefore, when the power switch 23 is switched from an off-state to an on-state, electric power is supplied from the auxiliary battery 21 to the P terminal, and when the power switch 23 is switched from the on-state to an off-state, the supply of electric power from the auxiliary battery 21 to the P terminal is interrupted (stopped).

As shown in FIG. 2, the control unit 5 includes a backup power supply circuit 51 therein. The backup power supply circuit 51 is connected to the K terminal. Therefore, electric power is constantly supplied to the backup power supply circuit 51 from the auxiliary battery 21 connected to the K terminal. In this way, when for example the power switch 23 is in an off-state and electric power is not supplied from the auxiliary battery 21 to the P terminal, data or the like stored in a storage device (such as a random access memory (RAM)) provided in the control unit 5 is maintained.

The state in which no electric power is supplied from the auxiliary battery 21 to the P terminal while electric power is supplied to the backup power supply circuit 51 as described above is referred to as the "sleep state of the control unit 5."

The backup power supply circuit 51 is connected to the N terminal of the control unit 5. Therefore, electric power can be supplied from the backup power supply circuit 51 to the N terminal, and when the switch of the on-board device 30 or the on-board switch 40 is turned on, current is passed from the backup power supply circuit 51 to the N terminal, the activation request signal circuit 25, and the switch 301 of the on-board device 30 or the on-board switch 40 in this order (the activation request signal is input (the activation request signal is on)).

The control unit 5 includes a control unit power supply 52 therein. The control unit power supply 52 is connected to the L terminal. The control unit power supply 52 is enabled to supply power from the auxiliary battery 21 through the L terminal when the switch 221 of the power supply relay 22 is switched from an off-state to an on-state and is disabled to supply electric power from the auxiliary battery 21 through the L terminal (supply of electric power is interrupted) when the switch 221 of the power supply relay 22 is switched from an on-state to an off-state.

The control unit 5 includes an activation circuit 53 therein. The activation circuit 53 is adapted to connect the backup power supply circuit 51 and the M terminal (the control power supply control circuit 24). The activation circuit 53 has one end connected to the M terminal (the control power supply control circuit 24).

The control unit 5 has a first transistor 54 between the backup power supply circuit 51 and the activation circuit 53. The first transistor 54 has its emitter E connected with the backup power supply circuit 51, and the first transistor 54 has its collector C connected with the activation circuit 53. The first transistor 54 has its base B connected to the N terminal (the activation request signal circuit 25) through the backup power supply circuit 51.

Therefore, the switch 301 of the on-board device 30 or the on-board switch 40 is turned on, current is passed (the activation request signal is input) from the backup power supply circuit 51 to the activation request signal circuit 25 (the N terminal), the potential of the base B of the first transistor 54 is changed from a high level to a low level, and current is passed from the emitter E of the first transistor 54 to the collector C, the activation circuit 53, the M terminal, the control power supply control circuit 24, and the coil 222 of the power supply relay 22 in this order, so that the coil 222 of the power supply relay 22 is excited. More specifically, when the activation request signal is input (the activation request signal is on) in response to turning on of the switch 301 of the on-board device 30 or the on-board switch 40, electric power is supplied from the backup power supply circuit 51 to the power supply relay 22 (the coil 222) through the first transistor 54, so that the coil 222 of the power supply relay 22 is excited. In this way, the switch 221 of the power supply relay 22 is turned on, so that the auxiliary battery 21 is allowed to supply electric power to the control unit power supply 52.

The control unit 5 further includes a second transistor 55 between the control unit power supply 52 and the M terminal. The second transistor 55 has its emitter E connected with the control unit power supply 52, and the second transistor 55 has its collector C connected with the M terminal.

The second transistor 55 has its base B connected with the control unit power supply 52 and a switch 56.

Therefore, when the switch 56 is turned on and current is passed from the control unit power supply 52 to the switch 56 while electric power is supplied to the control unit power supply 52, the potential of the base B of the second transistor 55 is changed from a high level to a low level, current is passed from the emitter E of the second transistor 55 to the collector C, the M terminal, the control power supply control circuit 24, and the coil 222 of the power supply relay 22 in this order, so that the coil 222 of the power supply relay 22 continues to be excited by electric power from the auxiliary battery 21. In this way, while the switch 56 is in an on-state, the switch 221 of the power supply relay 22 is kept in an on-state, so that electric power continues to be supplied from the auxiliary battery 21 to the control unit power supply 52, which keeps the control unit 5 activated. Note that the switch 56 is controlled to be turned on/off by the control unit 5.

The control unit 5 has its P and M terminals connected therein (not shown). Therefore, when the power switch 23 is switched from an off-state to an on-state, current is passed from the auxiliary battery 21 to the P terminal, the M terminal, the control power supply control circuit 24, and the coil 222 of the power supply relay 22 in this order, so that the coil 222 of the power supply relay 22 is excited. In this way, the switch 221 of the power supply relay 22 is turned on, so that electric power is supplied from the auxiliary battery 21 to the L terminal (the control unit 5 is activated). Note that when the control unit 5 is activated, the control unit 5 turns on the switch 56, so that the switch 221 of the power supply relay 22 is kept in an on-state similarly to the above, and while the power switch 23 is in an on-state, the control unit 5 continues to be activated.

Meanwhile, when the power switch 23 is switched from the on-state to an off-state, the flow of current from the auxiliary battery 21 to the P terminal is interrupted. In this way, the switch 221 of the power supply relay 22 can be turned off by turning off the switch 56. More specifically, the supply of electric power from the auxiliary battery 21 to the L terminal can be interrupted (the control unit 5 can be stopped (into a sleep state)). Note that when the power switch 23 is switched from an on-state to an off-state, the switch 56 is turned off by the control unit 5, so that the control unit 5 is stopped (into a sleep state).

Figure 3:
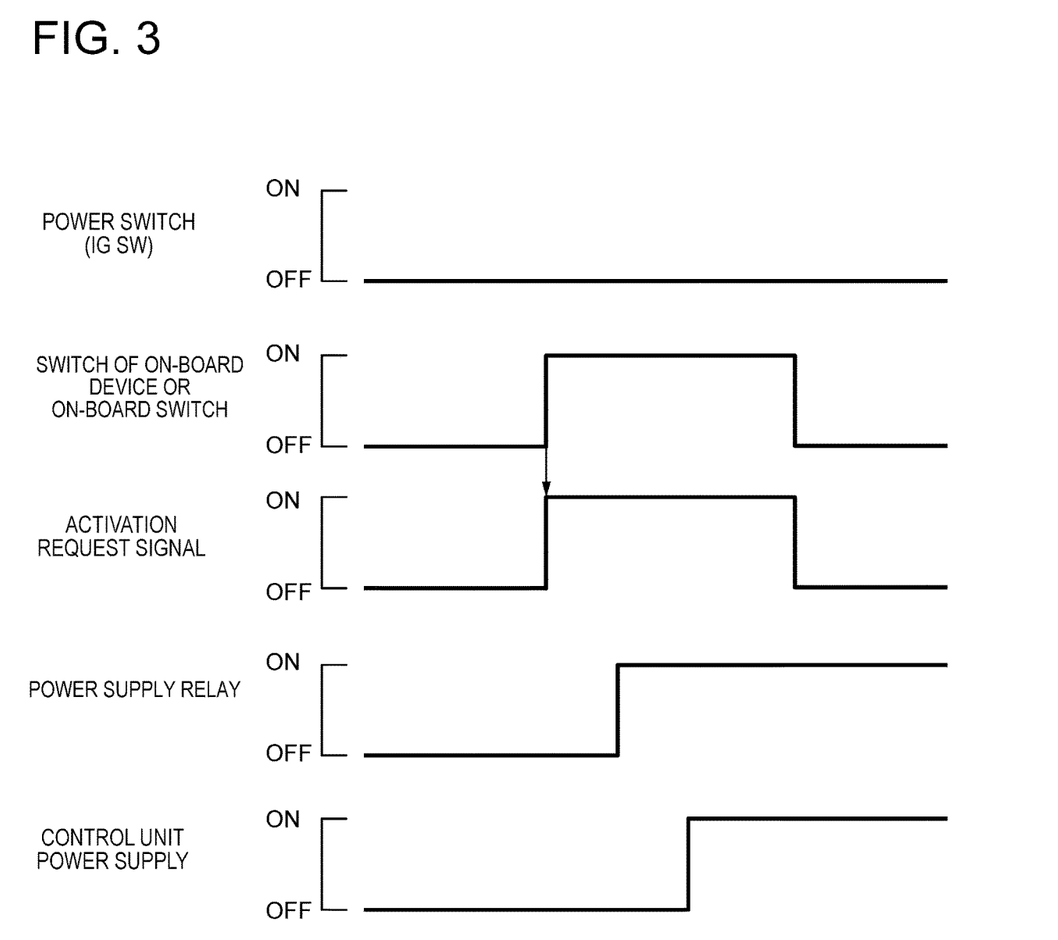
FIG. 3 is a timing chart for use in illustrating an activation sequence by the vehicle activation system shown in FIG. 2.

FIG. 3 is a timing chart for illustrating an activation sequence by the activation system 1 when the control unit 5 shown in FIG. 2 is in a sleep state (when the power switch 23 is in an off-state) and the switch 301 of the on-board device 30 or the on-board switch 40 is turned on.

As shown in FIG. 3, in the vehicle activation system 1 according to the embodiment of the present invention, when the switch 301 of the on-board device 30 or the on-board switch 40 is switched from an off-state to an on-state, current is passed from the backup power supply circuit 51 to the emitter E and the base B of the first transistor 54, (the N terminal), the activation request signal circuit 25, and the switch 301 of the on-board device 30 or the on-board switch 40 in this order (the activation request signal is detected at the control unit 5). Accordingly, current is passed from the emitter E of the first transistor 54 to the collector C, the activation circuit 53, (the M terminal), the control power supply control circuit 24, and the coil 222 of the power supply relay 22 in this order, so that the coil 222 of the power supply relay 22 is excited. In this way, the switch 221 of the power supply relay 22 is turned on, and supply of electric power from the auxiliary battery 21 to the control unit power supply 52 is allowed (the control unit 5 is activated).

Therefore, when the power switch 23 is in an off-state and the control unit 5 is in a sleep state, supply of electric power from the auxiliary battery 21 to the control unit power supply 52 is allowed in response to switching of the switch 301 of the on-board device 30 or the on-board switch 40 from an off-state to an on-state, so that the control unit 5 is activated.

When the control unit 5 is activated, supply of electric power is allowed from the auxiliary battery 21 to the control unit power supply 52, and the switch 56 is switched from an off-state to an on-state (the switch 56 is switched to an on-state by the control unit 5), current is passed from the control unit power supply 52 to the emitter E and base B of the second transistor 55, the collector C of the second transistor 55, (the M terminal), and the coil 222 of the power supply relay 22 in this order. Therefore, even when the switch 301 of the on-board device 30 or the on-board switch 40 is switched from an on-state to an off-state after activation of the control unit 5 and current is no longer passed to the activation circuit 53, current continues to be passed through the coil 222 of the power supply relay 22 and the coil 222 of the power supply relay 22 continues to be excited. This keeps the switch 221 of the power supply relay 22 in an on-state, so that electric power continues to be supplied from the auxiliary battery 21 to the control unit power supply 52 (the control unit 5 continues to be in an activated state).

Meanwhile, when electric power continues to be supplied from the auxiliary battery 21 to the control unit power supply 52 and the switch 56 is switched from an on-state to an off-state (the switch 56 is switched to an off-state by the control unit 5), the flow of current from the emitter E to the collector C of the second transistor 55 is interrupted, so that the coil 222 of the power supply relay 22 is demagnetized. In this way, the switch 221 of the power supply relay 22 is turned off from the on-state, so that the supply of electric power from the auxiliary battery 21 to the control unit power supply 52 is interrupted (the control unit 5 is stopped (into a sleep state)).

In the vehicle activation system 1, upon the occurrence of an abnormality which causes the activation request signal circuit 25 to be constantly in a current-conducting state (the state in which the activation request signal continues to be input thereto), in other words, if the abnormality causes the backup power supply circuit 51 to keep supplying electric power to the power supply relay 22 (the coil 222) (hereinafter as an "abnormality Er"), the power supply relay 22 (the switch 221) cannot be turned off and the control unit 5 cannot be stopped. For example, if the power switch 23 is in an off-state, the control unit 5 is activated unintendedly and cannot be stopped. If the power switch 23 is in an on-state, the control unit 5 cannot be stopped even by tuning off the power switch 23. If the control unit 5 cannot be stopped, the auxiliary battery 21 may be over-discharged, so that vehicle cannot be started.

Examples of the abnormality Er which causes the activation request signal circuit 25 to be constantly in a current-conducting state (the state in which the activation request signal continues to be input thereto) include a ground fault which causes the activation request signal circuit 25 to be short-circuited (grounded) to the vehicle body of the PHEV and the state in which the switch 301 of the on-board device 30 or the on-board switch 40 is fixed in an on-state. More specifically, current is passed from the positive electrode of the auxiliary battery 21 to the backup power supply circuit 51, the activation request signal circuit 25, the vehicle body of the PHEV, and the negative electrode of the auxiliary battery 21 in this order, so that the potential of the N terminal is switched from a high level to a low level.

Figure 4:
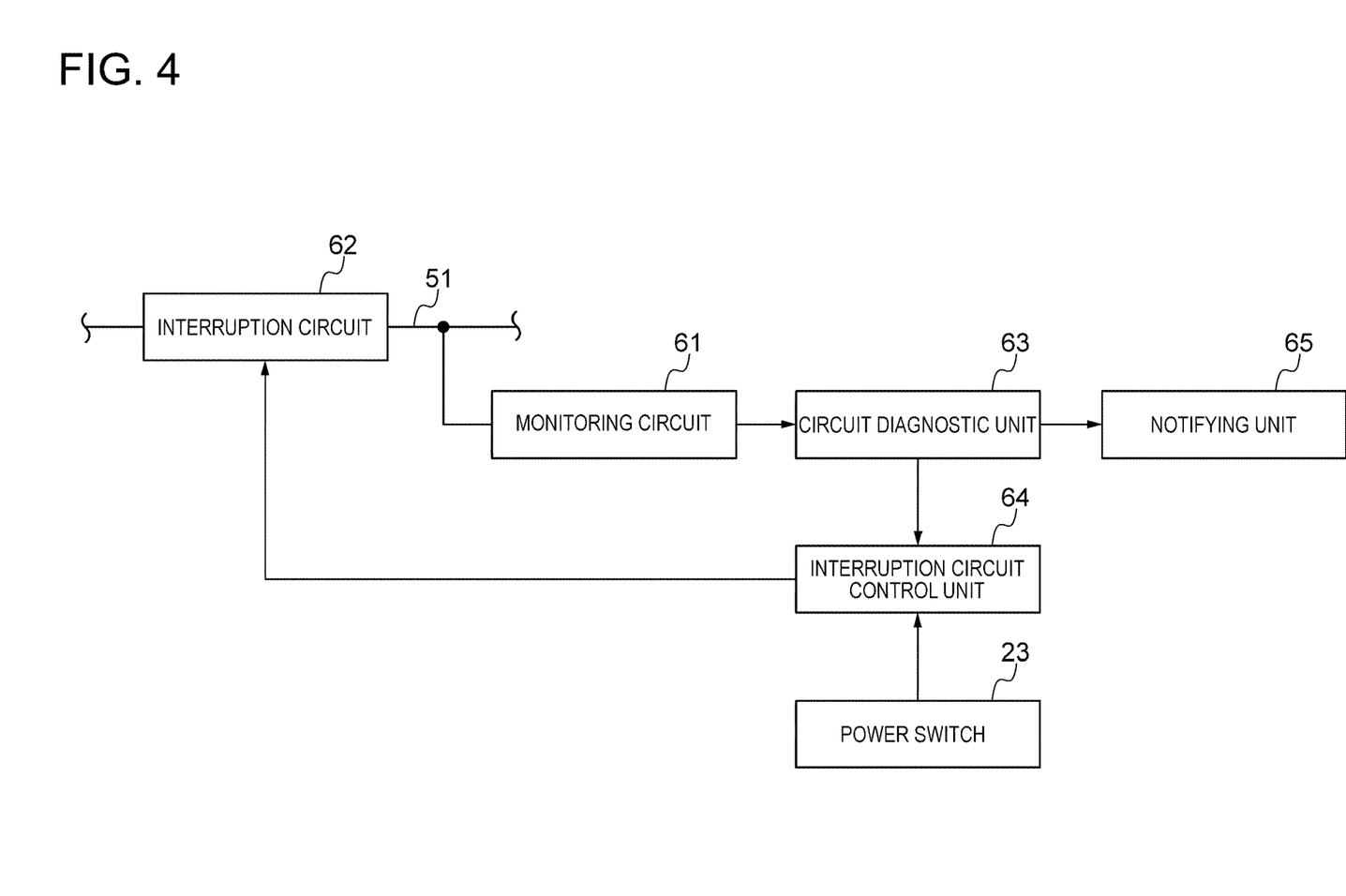
FIG. 4 is a block diagram showing a configuration of how fault diagnosis and circuit interruption can be achieved in the vehicle activation system according to the embodiment.
Figure 5A:
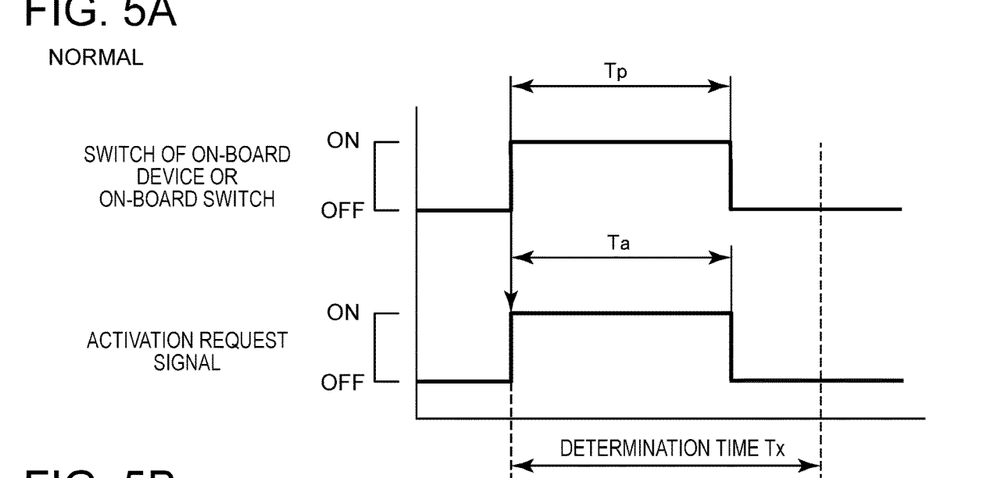
FIG. 5A is a timing chart in a normal state for use in illustrating diagnosis performed by a circuit diagnostic unit shown in FIG. 4.
Figure 5B:
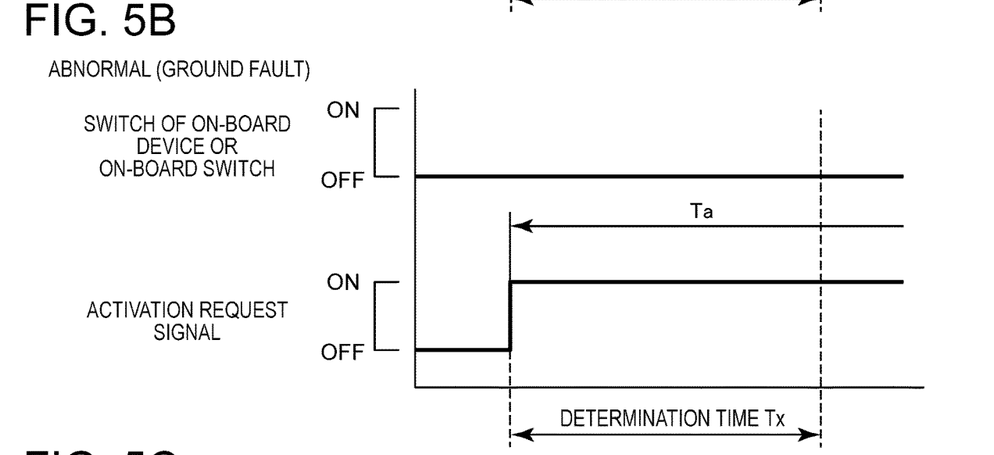
FIG. 5B is a timing chart in an abnormal state (with a ground fault) for use in illustrating diagnosis performed by a circuit diagnostic unit shown in FIG. 4.
Figure 5C:
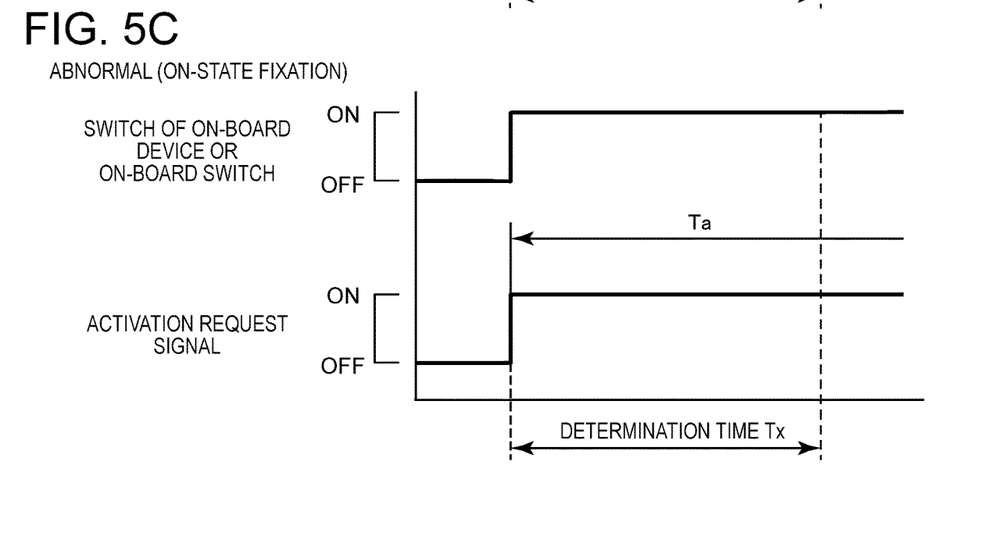
FIG. 5C is a timing chart in an abnormal state (with on-state fixation) for use in illustrating diagnosis performed by a circuit diagnostic unit shown in FIG. 4.

FIG. 4 is a block diagram showing a configuration of how the occurrence of a fault, an abnormality Er in this example, can be diagnosed in the vehicle activation system 1 according to the embodiment of the present invention, and how circuit interruption for interrupting supply of electric power from the backup power supply circuit 51 to the coil 222 of the power supply relay 22 can be achieved in response to a result of diagnosis. FIGS. 5A to 5C are timing charts for illustrating diagnosis carried out by the circuit diagnostic unit 63 shown in FIG. 4, FIG. 5A illustrates a normal state, FIG. 5B illustrates an abnormal state (with a ground fault), and FIG. 5C is an abnormal state (with on-state fixation).

As show in FIGS. 2 and 4, the activation system 1 according to the embodiment of the present invention includes, in the control unit 5, a monitoring circuit 61, an interruption circuit 62A, the circuit diagnostic unit 63, and an interruption circuit control unit 64.

As shown in FIG. 2, the monitoring circuit 61 is for example connected to the backup power supply circuit 51. The monitoring circuit 61 is for example connected between the base B of the first transistor 54 and the N terminal. The monitoring circuit 61 can monitor the input state of the activation request signal, i.e., the state of current (the conduction state) passed from the backup power supply circuit 51 to the activation request signal circuit 25. Here, the activation request signal is for example the potential of the N terminal, and the potential of the N terminal changes from a high level to a low level when the switch 301 of the on-board device 30 or the on-board switch 40 is turned on (the activation signal is turned on). More specifically, according to the embodiment shown in FIG. 2, the monitoring circuit 61 monitors the input state of the activation request signal (the state of current passed to the activation request signal circuit 25) by monitoring change in the potential (application voltage) of the N terminal.

The interruption circuit 62A is provided for example at the backup power supply circuit 51. The interruption circuit 62A is for example provided between the base B of the first transistor 54 and the N terminal. The interruption circuit 62A is for example connected in series in the backup power supply circuit 51. The interruption circuit 62A can perform circuit interruption in the backup power supply circuit 51 or can interrupt current passed to the activation request signal circuit 25 and also allows the interrupted circuit to recover.

The interruption circuit 62A performs circuit interruption in response to input of a signal instructing circuit interruption (hereinafter as the "circuit interruption signal") from the interruption circuit control unit 64 which will be described and allows the interrupted circuit to recover in response to input of a signal instructing the interrupted circuit to recover (hereinafter as the "circuit recovering signal") from the interruption circuit control unit 64.

In this way, current passed to the activation request signal circuit 25 can be interrupted (the activation request signal can be turned off) by the interruption circuit 62A provided at the backup power supply circuit 51, so that supply of electric power to the power supply relay 22 (the coil 222) from the backup power supply circuit 51 through the activation circuit 53 can be interrupted (prevented). Therefore, upon the occurrence of an abnormality Er (a ground fault of the activation request signal circuit 25 and the on-state fixation of the switch 301 of the on-board device 30 or the on-board switch 40), current passed to the activation request signal circuit 25 can be interrupted by the interruption circuit 62A, so that the control unit 5 can attain a stoppable state. In this way, the control unit 5 can be stopped in response to turning off of the power switch 23.

Note that the circuit interruption here refers not only to opening and interrupting the circuit physically or electrically but also to electrically interrupting the circuit (invalidating application voltage) for example by controlling the potential (the application voltage).

The interruption circuit 62A includes a mechanical switch which can open/close a circuit or an electrical switch which includes a circuit capable of invalidating a signal by forcibly changing the potential (application potential). For example, the electrical switch may be configured as a combination of one or more transistors or logic ICs.

Note that the interruption circuit 62A may be provided in any position between the connection position of the monitoring circuit 61 and the N terminal or between the base B of the first transistor 54 and the connection position of the monitoring circuit 61 if the position is between the base B of the first transistor 54 and the N terminal.

The circuit diagnostic unit 63 can diagnose whether an abnormality Er has occurred, more specifically an abnormality which causes the activation request signal to be constantly input for example because of the on-state fixation of the switch 301 of the on-board device 30 or the on-board switch 40 and a ground fault of the activation request signal circuit 25. The circuit diagnostic unit 63 is connected with the monitoring circuit 61, and the state of the activation request signal (the potential of the N terminal) monitored by the monitoring circuit 61 is input to the circuit diagnostic unit 63.

As shown in FIGS. 5A to 5C, in a normal case (see FIG. 5A), the activation request signal circuit 25 passes current and the activation request signal is input (on) thereto only during the period in which the switch 301 of the on-board device 30 or the on-board switch 40 is in an on-state.

For example, upon the occurrence of a ground fault of the activation request signal circuit 25, the switch 301 of the on-board device 30 or the on-board switch 40 is in an off-state, but the activation request signal circuit 25 is constantly in a current-conducting state, and therefore the activation request signal continues to be input (on) (see FIG. 5B). Upon the occurrence of the on-state fixation of the switch 301 of the on-board device 30 or the on-board switch 40, the switch 301 of the on-board device 30 or the on-board switch 40 is kept in an on-state, which causes the activation request signal circuit 25 to be constantly in a current-conducting state, so that the activation request signal continues to be input (on) (see FIG. 5C).

The circuit diagnostic unit 63 diagnoses the activation request signal circuit 25 and the switch 301 of the on-board device 30 or the on-board switch 40 as operating normally if the input time Ta for the activation request signal (the conduction time of the activation request signal circuit 25), such as a period during which the potential of the N terminal is at a low level, is less than a preset period of time (hereinafter as the "determination time Tx"), while the circuit diagnostic unit diagnoses the activation request signal circuit 25 and the switch 301 of the on-board device 30 or the on-board switch 40 as operating abnormally, in other words, the occurrence of an abnormality Er if the input time Ta (the conduction time of the activation request signal circuit 25) is not less than the determination time.

The determination time Tx is set as appropriate depending on the on-board device 30 or the on-board switch 40 connected with the activation request signal circuit 25. For example, as for the on-board device 30, if a set time for switching the switch 301 of the on-board device 30 on and a time during which the user presses the on-board switch 40 is called "switch-on time Tp," the determination time Tx is set to a longer period of time than the switch on time Tp. As for the on-board switch 40, the determination time Tx is set to a time period sufficiently longer than the period during which the user presses the on-board switch 40, for example to several ten times as long.

The interruption circuit control unit 64 can control the interruption circuit 62A. The interruption circuit control unit 64 can be provided with a signal notifying about an abnormality Er as an input (hereinafter as the "abnormality signal") if the circuit diagnostic unit 63 determines the abnormality Er. The interruption circuit control unit 64 outputs a circuit interruption signal to the interruption circuit 62A upon receiving the abnormality signal as an input from the circuit diagnostic unit 63.

In this way, the monitoring circuit 61 monitors current (the activation request signal) passed to the activation request signal circuit 25 from the backup power supply circuit 51, and the circuit diagnostic unit 63 diagnoses whether an abnormality Er has occurred on the basis of the current monitored by the monitoring circuit 61 (the period during which the activation request signal is detected). When the circuit diagnostic unit 63 diagnoses the occurrence of an abnormality Er, the interruption circuit control unit 64 causes the interruption circuit 62A to interrupt the circuit of the backup power supply circuit 51, so that the current passed to the activation request signal circuit 25 is interrupted.

In this way, the potential of the base B of the first transistor 54 is changed from a low level to a high level, and no current is passed from the emitter E to the collector C of the first transistor 54. As a result, the current passed from the backup power supply circuit 51 to the control power supply control circuit 24 through the activation circuit 53 is interrupted, and supply of electric power from the backup power supply circuit 51 to the power supply relay 22 (the coil 222) is interrupted (prevented). Therefore, upon the occurrence of an abnormality Er, the control unit 5 can attain a stoppable state.

Note that the control unit 5 is stopped after the interruption of the circuit (current) by the interruption circuit 62A, provided that the power switch 23 is turned off. More specifically, when the power switch 23 is in an off-state, the switch 56 is immediately turned off, so that the supply of electric power (the control unit 5) is stopped, while when the power switch 23 is in an on-state, the switch 56 is turned off when the power switch 23 is turned off, so that the supply of electric power (the control unit 5) is stopped.

The interruption circuit control unit 64 can be provided with a state signal representing the on/off-state of the switch from the power switch 23 (hereinafter as the "power switch on signal") as an input. The interruption circuit control unit 64 outputs, to the interruption circuit 62A, a circuit recovering signal which causes the interruption circuit 62A to achieve recovery of the circuit from the interruption when the circuit is interrupted between the base B of the first transistor 54 and the N terminal and the state signal of the power switch 23 is switched from an off-state to an on-state, in other words, the vehicle is started from the stopped state.

The activation system 1 according to the embodiment of the present invention further has a notifying unit 65. The notifying unit 65 can notify about the occurrence of an abnormality Er. The notifying unit 65 can be provided with an abnormality signal as an input from the circuit diagnostic unit 63. The notifying unit 65 notifies about the occurrence of an abnormality Er through a warning light, a warning indication, a buzzer or the like provided at a combination meter or the like in response to input of the abnormality signal from the circuit diagnostic unit 63.

In this way, when the circuit diagnostic unit 63 diagnoses the occurrence of an abnormality Er, the notifying unit 65 can notify about the occurrence. In this way, the user may be aware of the occurrence of the abnormality Er which causes the activation request signal circuit 25 to be constantly in a current-conducting state, in other words an abnormality which causes the activation request signal to continue to be input because of a ground fault of the activation request signal circuit 25 or the on-state fixation of the switch 301 of the on-board device 30 or the on-board switch 40.

Figure 6:
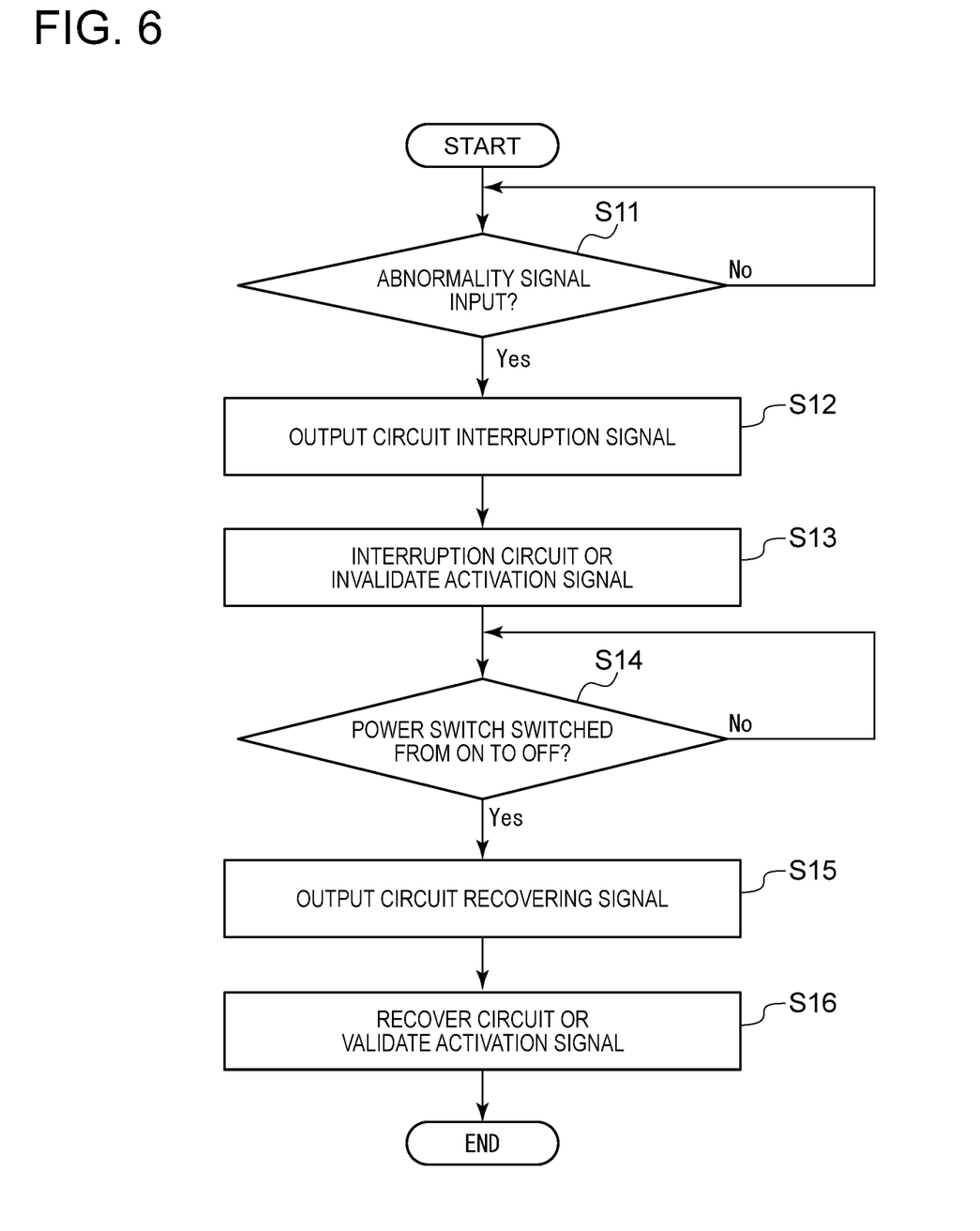
FIG. 6 is a flowchart for use in illustrating the content of control performed by an interruption circuit control unit shown in FIG. 4.

FIG. 6 is a flowchart for use in illustrating the content of control by the interruption circuit control unit 64 shown in FIG. 4.

As shown in FIG. 6, the interruption circuit control unit 64 outputs a circuit interruption signal to the interruption circuit 62A (step S12) in response to input of an abnormality signal from the circuit diagnostic unit 63 (Yes in step S11). In response to input of the circuit interruption signal to the interruption circuit 62A, the interruption circuit 62A interrupts the circuit between the base B of the first transistor 54 and the N terminal (step S13). In this way, current passed from the backup power supply circuit 51, the first transistor 54, the activation circuit 53, and the coil 222 of the power supply relay 22 in this order is interrupted. When the power switch 23 is in an off-state, the control unit 5 is immediately stopped to attain a sleep state, while when the power switch 23 is in an on-state, the control unit 5 is stopped to attain a sleep state when the power switch 23 is turned off.

When the control unit 5 is stopped, and then the power switch 23 is switched from an off-state to an on-state (Yes in step S14) while the interruption circuit 62A interrupts the circuit between the base B of the first transistor 54 and the N terminal, the interruption circuit control unit 64 outputs a circuit recovering signal to the interruption circuit 62A (step S15). When the circuit recovering signal is input to the interruption circuit 62A, the circuit which has been interrupted by the interruption circuit 62A between the base B of the first transistor 54 and the N terminal is recovered (step S16).

In this way, when the control unit 5 is stopped, and the power switch 23 is switched from an off-state to an on-state, the circuit which has been interrupted by the interruption circuit 62A is recovered and may be determined again for an abnormality Er. Therefore, if for example the switch 301 of the on-board device 30 or the on-board switch 40 is temporarily fixed to an on-state or an abnormality Er is determined because the on-board switch 40 continues to be pressed for a long period by some mischievous conduct, the circuit may be returned to the normal state when the power switch 23 is switched from an off-state to an on-state. Note that when an abnormality Er occurs, the circuit is interrupted again by the interruption circuit 62A as in the above-described flow.

Figure 7:
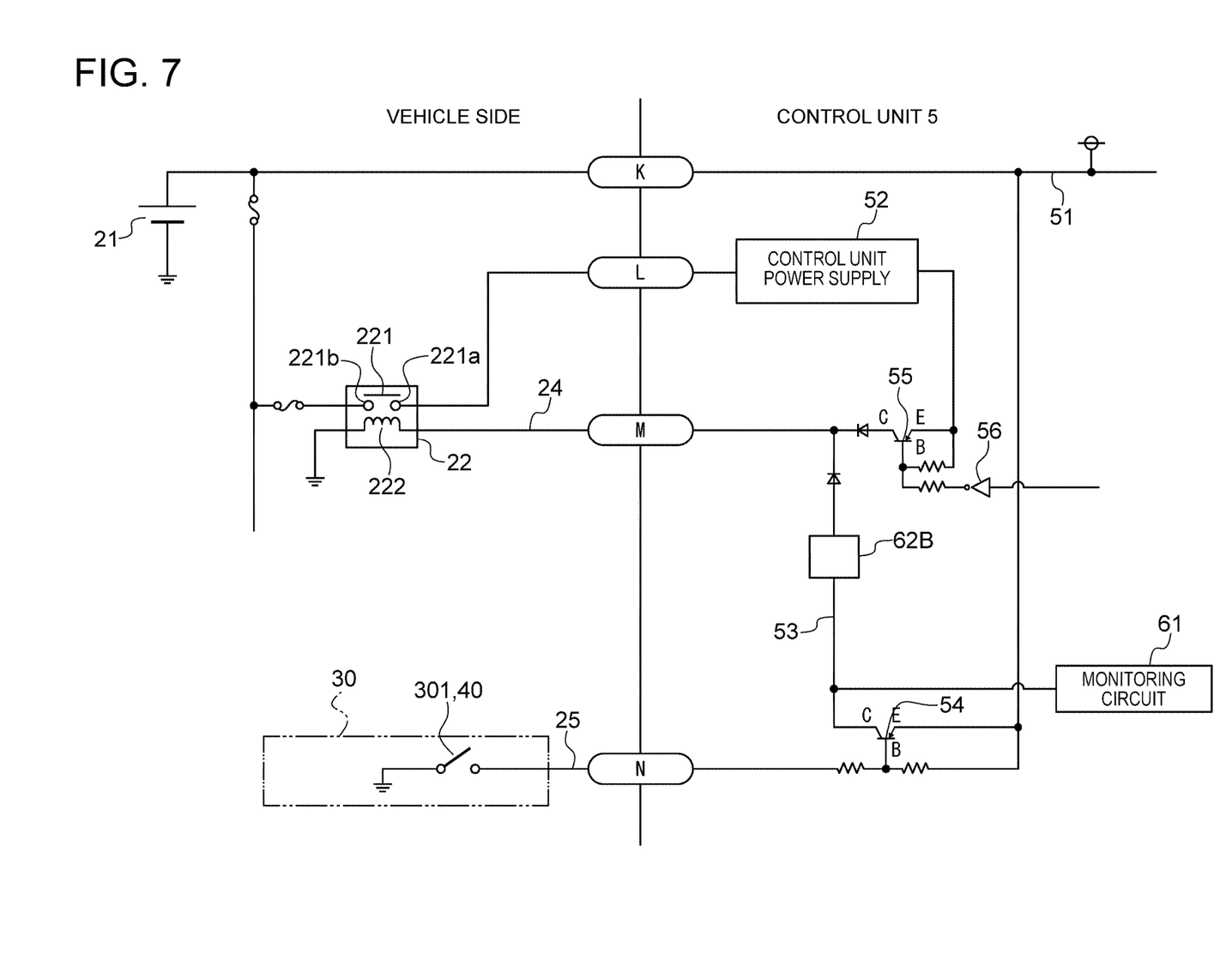
FIG. 7 is a circuit diagram showing in detail a vehicle activation system according to an alternative embodiment to the embodiment shown in FIG. 1.

In the vehicle activation system 1 according to the embodiment of the present invention shown in FIG. 2, the interruption circuit 62A is provided between the base B of the first transistor 54 and the N terminal at the backup power supply circuit 51, while the invention is not limited by the arrangement, and the interruption circuit 62B may be provided at the activation circuit 53 as shown in FIG. 7 according to some embodiments.

According to an embodiment shown in FIG. 7, the interruption circuit 62B is for example provided between the collector C of the first transistor 54 and the M terminal, and the monitoring circuit 61 is for example provided between the collector C of the first transistor 54 and the interruption circuit 62B. In this case, the state of the activation request signal refers to the potential (the application voltage) of the collector C of the first transistor 54, and when the switch 301 of the on-board device 30 or the on-board switch 40 is in an on-state (when the activation request signal is in an on-state), the potential of the collector C of the first transistor 54 changes from a low level to a high level. More specifically, the circuit diagnostic unit 63 determines whether the input time Ta for the activation request signal (the conduction period of the activation request signal circuit 25) is more than the determination time Tx on the basis of whether the period during which current is passed from the backup power supply circuit 51 to the activation circuit 53 exceeds the determination time Tx.

The interruption circuit 62B can interrupt the circuit in the activation circuit 53 or can interrupt current passed from the activation circuit 53 to the M terminal (the control power supply control circuit 24) and also allows the interrupted circuit to recover.

In this way, when the interruption circuit 62B is provided at the activation circuit 53, the circuit can be interrupted in the activation circuit 53, and therefore the flow of current passed from the backup power supply circuit 51 to the first transistor 54 and the control power supply control circuit 24 through the activation circuit 53 can be interrupted (prevented). In this way, the supply of electric power from the backup power supply circuit 51 to the power supply relay 22 (the coil 222) can be interrupted (prevented). Therefore, upon the occurrence of an abnormality Er which causes the activation request signal circuit 25 to be constantly in a current-conducting state, the control unit 5 can attain a stoppable state.

As in the foregoing, in the vehicle activation system 1 according to the embodiment of the present invention, upon the occurrence of an abnormality Er which causes the activation request signal circuit 25 to be constantly in a current-conducting state and the activation request signal to continue to be output for example because of the on-state fixation of the switch 301 of the on-board device 30 or the on-board switch 40 or a ground fault of the activation request signal circuit 25, supply of electric power from the backup power supply circuit 51 to the power supply relay 22 (the coil 222) is interrupted by the interruption circuit 62A, 62B, so that the control unit 5 can attain a stoppable state, and therefore the auxiliary battery 21 can be prevented from being over-discharged.

The present invention is not limited by the above described embodiments, and the invention includes various modifications of the embodiments and a combination of two or more of the modifications.

For example, according to the embodiments, the interruption by the interruption circuit is controlled by the circuit interruption control unit, while the interruption may be carried out manually by the user according to any of other embodiments.

Furthermore, according to the embodiments, one on-board device or one on-board switch is connected to the control unit (the control device) by one activation request signal circuit, while a plurality of on-board devices or a plurality of on-board switches may be connected to the control unit by a plurality of activation request signal circuits and an interruption circuit may be set for each of the devices or switches according to any of other embodiments.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A vehicle activation system, comprising: a controller activated in response to turning on of a vehicle power switch and stopped in response to turning off of the vehicle power switch; a battery which supplies electric power to the controller; a power supply relay provided between the controller and the battery and capable of turning on/off the supply of electric power from the battery to the controller; an activation circuit which connects a backup power supply circuit for the controller and the power supply relay; and a switch connected to the backup power supply circuit through a signal circuit and capable of passing current so that current is passed from the backup power supply circuit to the signal circuit, the vehicle activation system being configured so that current is passed from the backup power supply circuit to the signal circuit in response to turning on of the switch, so that electric power is supplied from the backup power supply circuit to the power supply relay, the vehicle activation system further comprising an interruption circuit capable of interrupting the supply of electric power from the backup power supply circuit to the power supply relay, upon occurrence of an abnormality which causes electric power to be kept being supplied from the backup power supply circuit to the power supply relay, whereby the control device cannot be stopped.

2. The vehicle activation system according to claim 1, wherein the interruption circuit is provided at the backup power supply circuit and capable of interrupting current passed from the backup power supply circuit to the signal circuit.

3. The vehicle activation system according to claim 2, wherein the controller is stopped after a circuit is interrupted by the interruption circuit, provided that the power switch is turned off.

4. The vehicle activation system according to claim 2, further comprising:
a monitoring circuit capable of monitoring current passed from the backup power supply circuit;
a circuit diagnostic unit capable of diagnosing an abnormality which causes the signal circuit to be constantly in a current-conducting state on the basis of the current monitored by the monitoring circuit; and
an interruption circuit control unit which causes the interruption circuit to perform circuit interruption when the circuit diagnostic unit diagnoses the abnormality,
wherein the circuit diagnostic unit diagnoses the abnormality when it is determined that the signal circuit continues to be in a current-conducting state for at least a prescribed period.

5. The vehicle activation system according to claim 2, wherein the switch is provided at an on-board device capable of requesting activation to the controller.

6. The vehicle activation system according to claim 2, wherein the switch is an on-board switch capable of requesting activation to the controller.

7. The vehicle activation system according to claim 1, wherein the interruption circuit is provided at the activation circuit and capable of interrupting current passed from the backup power supply circuit to the activation circuit.

8. The vehicle activation system according to claim 7, wherein the controller is stopped after a circuit is interrupted by the interruption circuit, provided that the power switch is turned off.

9. The vehicle activation system according to claim 7, further comprising:
a monitoring circuit capable of monitoring current passed from the backup power supply circuit;
a circuit diagnostic unit capable of diagnosing an abnormality which causes the signal circuit to be constantly in a current-conducting state on the basis of the current monitored by the monitoring circuit; and
an interruption circuit control unit which causes the interruption circuit to perform circuit interruption when the circuit diagnostic unit diagnoses the abnormality,
wherein the circuit diagnostic unit diagnoses the abnormality when it is determined that the signal circuit continues to be in a current-conducting state for at least a prescribed period.

10. The vehicle activation system according to claim 7, wherein the switch is provided at an on-board device capable of requesting activation to the controller.

11. The vehicle activation system according to claim 1, wherein the controller is stopped after a circuit is interrupted by the interruption circuit, provided that the power switch is turned off.

12. The vehicle activation system according to claim 11, further comprising:
a monitoring circuit capable of monitoring current passed from the backup power supply circuit;
a circuit diagnostic unit capable of diagnosing an abnormality which causes the signal circuit to be constantly in a current-conducting state on the basis of the current monitored by the monitoring circuit; and
an interruption circuit control unit which causes the interruption circuit to perform circuit interruption when the circuit diagnostic unit diagnoses the abnormality,
wherein the circuit diagnostic unit diagnoses the abnormality when it is determined that the signal circuit continues to be in a current-conducting state for at least a prescribed period.

13. The vehicle activation system according to claim 1, further comprising:
a monitoring circuit capable of monitoring current passed from the backup power supply circuit;
a circuit diagnostic unit capable of diagnosing an abnormality which causes the signal circuit to be constantly in a current-conducting state on the basis of the current monitored by the monitoring circuit; and
an interruption circuit control unit which causes the interruption circuit to perform circuit interruption when the circuit diagnostic unit diagnoses the abnormality,
wherein the circuit diagnostic unit diagnoses the abnormality when it is determined that the signal circuit continues to be in a current-conducting state for at least a prescribed period.

14. The vehicle activation system according to claim 13, wherein the switch is provided at an on-board device capable of requesting activation to the controller.

15. The vehicle activation system according to claim 13, wherein when the power switch is switched from an off-state to an on-state while the circuit is interrupted by the interruption circuit, the interruption circuit control unit causes the interruption circuit to achieve recovery of the circuit from the interruption.

16. The vehicle activation system according to claim 15, further comprising a notifying unit capable of notifying about the abnormality when the circuit diagnostic unit diagnoses the abnormality.

17. The vehicle activation system according to claim 13, further comprising a notifying unit capable of notifying about the abnormality when the circuit diagnostic unit diagnoses the abnormality.

18. The vehicle activation system according to claim 17, wherein the switch is provided at an on-board device capable of requesting activation to the controller.

19. The vehicle activation system according to claim 1, wherein the switch is provided at an on-board device capable of requesting activation to the controller.

20. The vehicle activation system according to claim 1, wherein the switch is an on-board switch capable of requesting activation to the controller.

* * * * *